United States Patent [19]

Sharp

[11] Patent Number: 4,545,245
[45] Date of Patent: Oct. 8, 1985

[54] LIQUID LEVEL SENSOR USING SONIC METHODS

[75] Inventor: David L. Sharp, Bristol, Vt.

[73] Assignee: Simmonds Precision Products, Inc., Tarrytown, N.Y.

[21] Appl. No.: 550,087

[22] Filed: Nov. 9, 1983

[51] Int. Cl.⁴ .............................................. G01F 23/00
[52] U.S. Cl. .................................... 73/290 V; 340/621
[58] Field of Search ...................... 73/290 V, 290 B; 340/621; 333/142; 181/108, 401; 250/577

[56] References Cited

U.S. PATENT DOCUMENTS

| | | | |
|---|---|---|---|
| 2,753,542 | 7/1956 | Rod et al. | 340/3 |
| 3,079,596 | 2/1963 | Atkinson | 340/244 |
| 3,656,134 | 4/1972 | Brown | 340/244 |
| 3,985,030 | 10/1976 | Charlton | 73/290 V |

FOREIGN PATENT DOCUMENTS

| | | | |
|---|---|---|---|
| 958776 | 1/1957 | Fed. Rep. of Germany . | |
| 809681 | 3/1959 | United Kingdom | 340/621 |
| 813497 | 5/1959 | United Kingdom . | |
| 0295984 | of 1971 | U.S.S.R. | 73/290 V |
| 0560144 | 5/1977 | U.S.S.R. | 73/290 V |

*Primary Examiner*—Charles Frankfort
*Assistant Examiner*—Thomas B. Will
*Attorney, Agent, or Firm*—Cushman, Darby & Cushman

[57] ABSTRACT

A liquid level sensor includes a pair of sonic waveguides separated from and parallel to one another. The waveguide pair together define axially separated pairs of lens surfaces so that sonic pulses are coupled therebetween in a time phase relationship when liquid covers those lens pairs below the liquid level, cross coupling of those lens pairs above the liquid level thereby being prevented. Since the axial separation dimension of the lens pairs is known as well as the vessel geometry and location of the waveguide pair in the vessel, counting the pulses returned by virtue of such cross coupling of those lens pairs below the liquid level will establish accurate level detection by standard algorithmic techniques.

12 Claims, 3 Drawing Figures

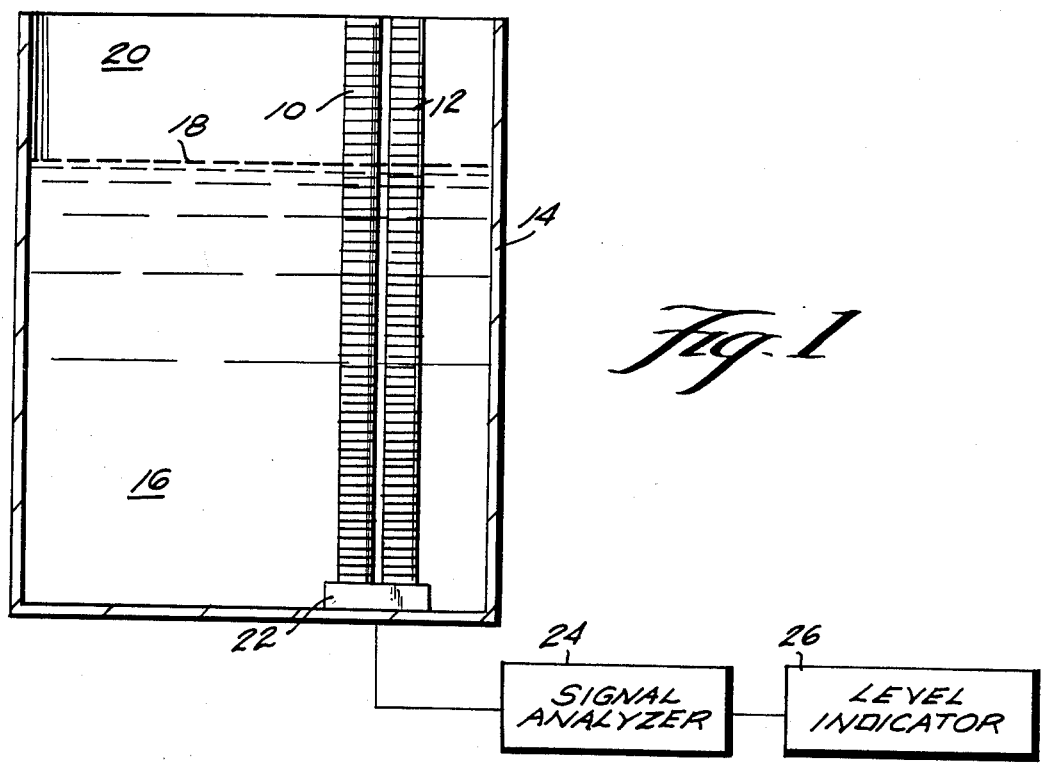
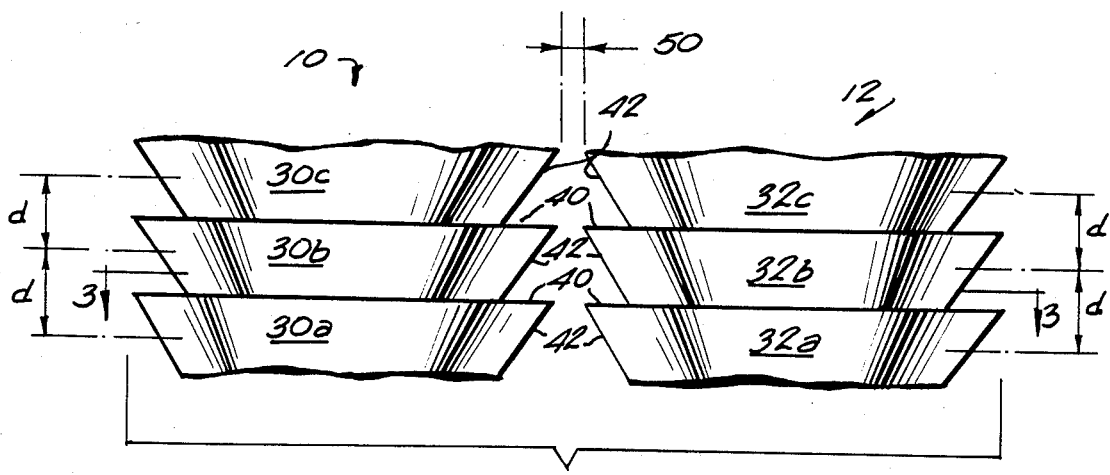
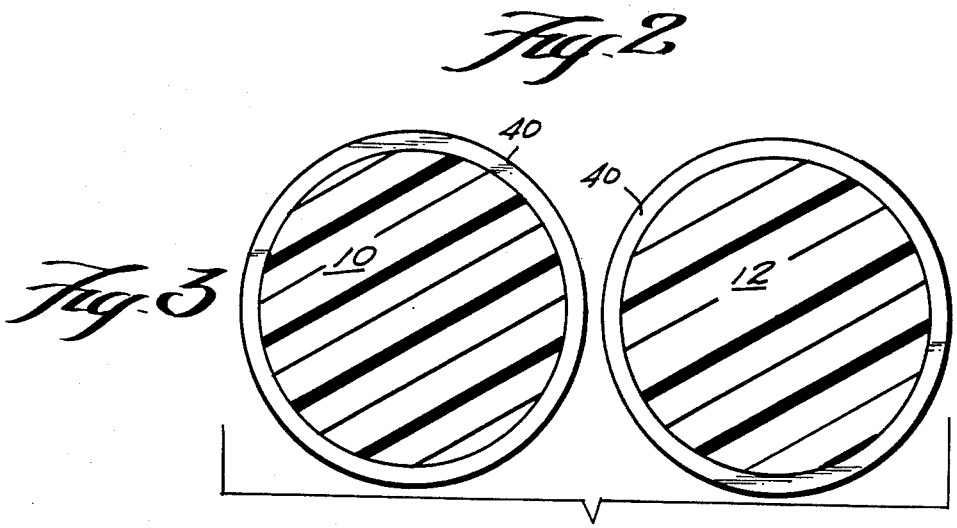

LIQUID LEVEL SENSOR USING SONIC METHODS

BACKGROUND AND SUMMARY OF THE PRESENT INVENTION

1. Introduction

The present invention generally relates to a genre of devices which detect liquid level in a container utilizing sonic wave techniques. More particularly, the present invention provides a novel liquid level detector which includes a pair of waveguides which together form axially spaced-apart pairs of discrete lenses to cross-couple refracted portions of a transmitted sonic wave pulse so as to digitalize liquid level information. Such information can then be analyzed by counting the returned cross-coupled portions which correspond to the liquid level in the container. Cross-coupling above the liquid level will, for all intents and purposes, not occur owing to the greater impedance of air. Thus, since tank geometry and the separation distance between lenses will be known values, liquid level in the container can be reliably established by counting the returned cross-coupled signals utilizing any suitable computing means.

The lenses of the present invention in their most preferred embodiment are each in the form of an inverted truncated cone having its base dimension upwardly disposed relative to the liquid surface. However, other shapes and surface curvatures are also contemplated. Thus, the lenses of the present invention in essence amount to intentional flaws in the waveguides so that discrete portions of the sonic pulses will be refracted at substantially right angles from the transmit waveguide and cross-coupled to the receive waveguide.

2. Information Disclosure Statement

The reader may wish at this time to refer to the following publications so that a more complete understanding of the novel characteristics of the present invention can be gained:

a. United States Patents
U.S. Pat. No. 3,656,134 to Brown
U.S. Pat. No. 3,079,596 to Atkinson
U.S. Pat. No. 3,985,030 to Charlton
U.S. Pat. No. 2,753,542 to Rod et al b. Foreign Patents
U.K. Pat. No. 813,497 to Worswick
U.K. Pat. No. 809,681 to Worswick et al
German Pat. No. 958,776 to Schwenkhagen Brown '134 discloses that separate chambers can be utilized to respectively house an ultrasonic transmitter and ultrasonic receiver. Particular attention is directed to column 6, line 37 through column 7, line 7 in Brown '134 wherein it is disclosed that the sonic waves emanating from the ultrasonic transmitter first pass through a liquid couplant than through wall 121, liquid lading 14, wall 121' and the liquid couplant surrounding ultrasonic receiver 124. Thus, the transmitter and ultrasonic receiver are each physically raised in their respective chambers until the liquid lading/air interface is sensed due to the higher acoustic impedance encountered by the ultrasonic waves through the air above the liquid lading surface.

Atkinson '596 discloses in one embodiment (see FIG. 1) a low level alarm utilizing an acoustic transmitter and receiver such that when aggregate material falls below the ends of the transmitter/receiver, the acoustic loop is complete which responsively actuates an alarm. In a second embodiment (see FIG. 2) plural acoustic sensors are fixed to the exterior of a tank at various levels. When the level of the aggregate material falls below one of the sensors, the acoustic loop between the transmitter and the exposed sensor is complete. Thus, by use of suitable electronics, the level of aggregate in the container can be determined.

Charlton '030 utilizes side-by-side mounted acoustic transmitter and receiver disposed in the bottom of a tank and directed upwardly relative the liquid level. Ultrasonic pulses transmitted by the transmitter are reflected at the liquid level and sensed by the receiver whereupon suitable electronics conditions the sensed pulses to provide a human readable level measurement.

Rod et al '542 disclose a closed servo loop system embodying a main pulsed transducer and an associated elapsed time measuring circuit adapted to gage distance to a liquid level. Thus, Rod et al '542 direct ultrasonic pulses towards the liquid level and sense the echos thereof to detect the liquid level.

U.K. Pat. No. 813,497 discloses a sonic level detector wherein the ends of the sonic transmitter and receiver are in opposing relationship while in U.K. Pat. No. 809,681 the sonic waves propagated by a transmitter are reflected in a space defined between the walls of a container holding the liquid. The illustrations in German Pat. No. 958,776 indicate a sonic device which operates on a principle whereby sonic waves are propagated up through the liquid and reflected back to the receiver wherein the time interval between transmission and reception is utilized so as to gage the liquid level in the container.

3. Summary of the Present Invention

As the reader can undoubtedly appreciate from even a cursory examination of the above publications, the present invention utilizes a novel concept for the detection of liquid level in a container. In a preferred embodiment of the present invention, a pair of ultrasonic waveguides are provided, one of which is designated the "transmit" waveguide while the other is designated the "receive" waveguide. Lenses defining sonic wave refraction surfaces are provided at substantially equal axial locations along each of the transmit and receive waveguides to form lens pairs. The waveguides are separated by a preselected dimension so as to form a region through which refracted portions of a sonic pulse can be transmitted to effect sonic cross-coupling of each lens pair which is below the liquid level.

The transmit and receive waveguides can thus be positioned in a liquid container of known geometry so that each lens of one waveguide is in substantially opposing relationship (e.g. at substantially a right-angle relationship) with an associated lens of the other waveguide. Sonic pulses are then transmitted through the transmit waveguide by a suitable known ultrasonic transducer and at each lens below the liquid/air interface (e.g. below the liquid level), a portion of the sonic energy from the pulses will be refracted through the liquid-filled region between the waveguides owing to the novel shaping of the lens surfaces. The lenses of each lens pair on the receive waveguide will therefore complete the cross-coupling of the refracted portion of the sonic wave and return it to a sonic receiving transducer. Since cross-coupling of the lens pairs is accomplished on a time phase basis, the return cross-coupled pulses will be discrete in time so that by electronically counting such pulses, an accurate indication of liquid level can be achieved. That is, since the lens pairs are axially separated by a known dimension, the number of return pulses will be indicative of the number of lens pairs below the liquid level and thus simple algorithmic techniques believed to be well within the ordinary skills of those in this art can be utilized to compute the relative liquid level in the container.

Materials for the waveguides are selected so that the relative impedances of the waveguide/liquid interface is far less than the waveguide/air interface to achieve a maximum amount of refracted sonic energy through the fluid-filled region between the waveguides as compared to the air-filled region. Thus, in some circumstances owing to the properties of the liquid whose level is desired to be detected, some lens cross-coupling of the sonic pulses in the air-filled region may occur. However, due to the greater impedance of the air, such cross-coupled signals will be highly attenuated so that by use of conventional noise filtering circuitry, returned pulses from the air region can be effectively disregarded during the computation of the liquid level.

The above advantages, as well as others, will become more clear to the reader after careful consideration is given to the detailed description of the preferred exemplary embodiment thereof which follows:

BRIEF DESCRIPTION OF THE ACCOMPANYING DRAWINGS

Reference will be hereinafter made to the accompanying drawings wherein like reference numerals throughout the various figures denote like structural elements and wherein:

FIG. 1 is a cross-sectional elevational view depicting the waveguides of the present invention in operative association with a liquid container;

FIG. 2 is an elevational view of a representative portion of the waveguides of the present invention; and FIG. 3 is a cross-sectional plan view taken along line 3—3 in FIG. 2.

DETAILED DESCRIPTION OF THE PREFERRED EXEMPLARY EMBODIMENT

Referring more particularly to the accompanying drawings and especially to FIG. 1 thereof, it can be seen that transmit waveguide 10 and receive waveguide 12 are positioned in a liquid containing vessel 14 which may be of any geometrical shape. Vessel 14 may also be any conventional type now in use, for example, open or closed vessels constructed of metal, reinforced fiberglass or other like materials. Liquid 16 contained in vessel 14 will define a level 18 therein above which will be air region 20.

An ultrasonic transducer 22 is operatively connected to transmit and receive waveguides 10, 12, respectively, and is of the conventional type which produces oscillations or pulses in the ultrasonic frequency range, such pulses thereby be transmitted axially along transmit waveguide 10. Discrete portions of such pulses, in a manner which will be described in more detail below, are then returned via the receive waveguide 12 whereupon such returned portions of the pulses are transformed into discrete electrical pulses by transducer 22. Ultrasonic transducers which function as above described, are in and of themselves well known to those in this art and thus further description thereof is not deemed necessary herein. However, the reader may wish to consider using ultrasonic transducers utilized by the applicant herein during laboratory experimentation of the present invention, such as EDO Model No. 41643-3 and Panametrics Model No. V401.

As will be discussed in more detail below, the present invention provides a unique device so that for each sonic pulse transmitted along transmit waveguide 10 there will be returned a discrete plurality of pulses corresponding in number to the number of lens pairs situated below liquid level 18. Operatively connected with transducer 22 therefore is signal analyzer 24 which reads or counts the discrete returned pulses and, by utilizing the known axial spacing between adjacent lens pairs, the known geometry of vessel 14 and location of the transmit/receive waveguides 10, 12, respectively, in vessel 14, generates a level signal indicative of liquid level 18 in vessel 14. The circuitry to perform such signal analysis is also believed to be well within the skill of those in this art and thus will not be further described herein. The applicant however has successfully utilized the Panametrics Ultrasonic Analyzer Model No. 5052UA during laboratory experimentation with the present invention. Signal analyzer 24 may also include suitable circuitry believed well known to those in this art to discriminate between true returned signal pulses and "noise" pulses. Thus, low magnitude signal pulses which may be returned via receive waveguide 12 due to partial coupling of lens pairs above liquid level 18 can be effectively eliminated by such known filtering circuitry. Thus, any coupling of sonic pulses which may occur above liquid level 18 will be greatly reduced in magnitude in comparison to the returned pulses of coupled lens pairs which has occurred below liquid level 18 owing to the greater impedance of air region 20.

The level signal generated by signal analyzer 24 may then be passed to a level indicator 26 which transforms the generated level signal into a human readable form. Alternately, the generated level signal can be passed to conventional process control equipment so as to maintain liquid 16 at a preselected level in vessel 14. The reader and those in this art may undoubtedly appreciate that other beneficial functions can be achieved once a level signal has been generated.

The above-described functions are realized by the unique design of the transmit/receive waveguides 10, 12, respectively, and for the discussion which follows attention is specifically directed to accompanying FIGS. 2 and 3 wherein a representative section of the transmit waveguide 10 and receive waveguide 12 are depicted. As shown therein, plural discrete lenses 30a–30c of transmit waveguide 10 are opposingly disposed relative to substantially identical lenses 32a–32c of receive waveguide 12. Lenses 30a/32a, 30b/32b and 30c/32c will therefore form respective lens pairs to achieve cross coupling of sonic pulses therebetween. The axial separation (e.g. center-to-center spacing "d") of adjacent lens pairs depends in large part upon the accuracy that is required for a given application in addition to the sensitivity of the electronic signal analyzers utilized. Presently it is preferred to axially separate adjacent lens pairs by about 0.2 inch although greater or lesser separation could be advantageously utilized. Thus, for example, with 0.2 inch separation of adjacent lens pairs, liquid level readings with 0.2 inch accuracy can be achieved.

In the most preferred embodiment of the present invention, lenses 30a–30c and 32a–32c are in the form of inverted truncated cones each of which defines a first substantially horizontal sonic pulse deflection surface 40 and a second upwardly and outwardly inclined surface 42. Transmit waveguide 10 and receive waveguide 12 are separated by a predetermined dimension 50 (see FIG. 2) so as to define therebetween a region occupied by either liquid or air in dependence upon the relative location of liquid level 18 in vessel 14. Optimum coupling of the waveguide lens pairs is achieved when the separation distance between transmit and receive waveguides 10, 12 are separated by a distance corresponding to about ¼ the wavelength of the transmitted sonic pulse.

Preferably, the angle between horizontal first surface 40 and its associated inclined second surface 42 is about 45°. Thus, as a sonic pulse is upwardly transmitted through transmit waveguide 10, a portion thereof will sequentially encounter first surface 40 of each lens 30a–30c and thus be internally reflected towards surface 42 at which point the reflected pulse is refracted at surface 42 and thence directed through the liquid in region 50 at substantially a right angle with respect to transmit waveguide 10. When such a pulse encounters surface 42 of a respective paired lens 32a–32c of receive waveguide 12, it is upwardly refracted towards surface 40 thereof at which point it is again internally reflected downwardly in receive waveguide 12 thereby completing the sonic coupling of the lens pairs 30a/32a, 30b/32b and 30c/32c.

Assuming that all three representative lens pairs 30a/32a, 30b/32b and 30c/32c shown in FIG. 2 are below liquid level 18 such that liquid occupies region 50, it is readily apparent that cross coupling of a sonic pulse will first occur in time at lens pair 30a/32a, then at lens pair 30b/32b, and finally at lens pair 30c/32c so that three distinctive pulses in time are returned via receive waveguide 12 to transducer 22. While only three representative lens pairs have been depicted in FIG. 2 for clarity of presentation, the reader should of course understand that as many lens pairs as are necessary for a given vessel application can be provided in accordance with the present invention. Additionally, while concentric axially separated lenses in the form of inverted truncated cones are shown as being preferred, only the opposing circumferential areas of waveguides 10, 12 could be provided with surfaces 40 and 42 to achieve similar advantageous operational characteristics.

The material from which waveguides 10, 12 are constructed is not critical but particular attention must be given to the properties of the specific liquid whose level is to be sensed so as to match impedances of the liquid and material to ensure that sufficient energy is refracted through region 50 when occupied by liquid. Thus, the relative impedances of the waveguide/liquid or waveguide/air interface at surfaces 42 determines the amount of sonic energy which will be refracted at the surfaces 42 through region 50 versus that energy which is internally reflected at surfaces 42 back into the transmit waveguide 10. For known fluid and air impedance properties, waveguide materials can be readily selected by those skilled in this art such that the refracted energy at the waveguide/liquid interface occurring at surfaces 42 below the liquid level far exceeds that of the waveguide/air interface occurring at surfaces 42 above the liquid level. Stated otherwise, the materials of waveguides 10, 12 are selected in view of the properties of the liquid whose level is to be sensed such that substantially all energy at the waveguide/liquid interface occurring at those surfaces 42 below the liquid level is refracted through region 50 whereas substantially all energy at the waveguide/air interface occurring at those surfaces 42 above the liquid level is internally reflected back into the transmit waveguide 10 thereby effectively preventing cross coupling of lenses thereat. Suitable materials from which waveguides 10,12 can be constructed can thus include, for example, aluminum, steel, lucite, plexiglass, nylon and crown glass, to name a few, and selection of such materials is dependent upon the particular application in practice. Once again, the reader should appreciate that although waveguides 10, 12 have been shown as being of a "plastic" material in the accompanying drawings, some metals could also be advantageously utilized.

Thus, while the present invention has been herein shown and described in what is presently conceived to be the most preferred embodiments thereof, those in this art may recognize that many modifications may be made hereof, which modifications shall be accorded the broadest interpretation of the appended claims so as to encompass all equivalent structures, assemblies and/or combinations.

What is claimed is:

1. In combination, a system for detecting liquid level in a vessel comprising:
    elongated transmit and receive waveguide means spaced from one another by a preselected dimension for respectively transmitting sonic waves of a predetermined wavelength and receiving discrete pulses of said waves refracted between said transmit and receive waveguide means, each of said transmit and receive waveguide means including means defining surfaces forming plural paired lenses axially separated from one another for refracting said pulses in time phase relationship between said transmit and receive waveguide means at substantially right angles relative thereto when said liquid occupies said space therebetween, said discrete pulses being returned by said receive waveguide means in said time phase relationship and being determinative of said liquid level in said vessel; and
    transducer means for transmitting said sonic waves through said transmit waveguide means and for receiving said discrete pulses returned by said receive waveguide means whereby said returned pulses are indicative of said liquid level in said vessel.

2. The system as in claim 1 further comprising signal analyzer means for counting said returned pulses and for generating an output signal in response thereto indicative of said liquid level.

3. The system as in claim 1 wherein said sonic waves have a wavelength $\lambda$ and wherein said preselected dimension is $\frac{1}{4}\lambda$.

4. The system as in claim 1 wherein said surface defining means defines a first substantially horizontal surface and a second outwardly and upwardly inclined surface.

5. The system as in claim 1 wherein said transmit and receive waveguide means are formed of a material having an impedance wherein substantially all energy of said discrete pulses is refracted at substantially a right angle from said transmit waveguide means to said receive waveguide means to complete coupling of those lens pairs below said liquid level and wherein substantially all energy of said discrete pulses is reflected internally in said transmit waveguide means to prevent coupling of those lens pairs above said liquid level, said transmit and receive waveguide means consisting essentially of said material.

6. The system as in claim 1 wherein adjacent ones of said paired lenses are separated by about 0.2 inch.

7. A sonic waveguide adapted to being disposed in a vessel containing liquid to assist in the sensing of liquid level therein comprising a pair of elongated waveguide members which establish therebetween a space, said pair of elongated waveguide members together including means defining plural paired lens surfaces axially disposed at predetermined intervals along said waveguide member, each said lens surface defining means for transmitting portions of sonic waves, axially propagating through one of said waveguide members, in the form of discrete pulses at substantially right angles relative to the other of said waveguide members through said space when said liquid is in a covering relationship therewith.

8. The waveguide of claim 7 wherein said means defining plural lens surfaces defines, for each such lens surface, a first substantially horizontal surface and a second upwardly and outwardly inclined surface.

9. The waveguide of claim 7 wherein said means defining plural lens surfaces defines, for each such lens surface, an inverted truncated cone.

10. The waveguide of claim 9 wherein adjacent ones of inverted truncated cones are axially separated from one another by about 0.2 inch.

11. A system for determining liquid level comprising:
a vessel for containing liquid at a preselected level therein;
transducer means for propagating a source of sonic waves and for receiving portions of said waves in the form of discrete pulses;
an elongated sonic transmit waveguide means connected to said transducer means at a preselected position in said vessel and extending through said liquid above said liquid level for transmitting sonic waves propagated therethrough;
an elongated sonic receive waveguide means connected to said transducer means and disposed parallel and adjacent to said transmit waveguide means to define therebetween a space for receiving portions of said sonic waves in the form of discrete pulses and returning said pulses to said transducer means, wherein said transmit and receive waveguide means together include means defining axially separated pairs of lens surfaces each for refracting said pulses at a substantially right angle relative to said transmit waveguide means when respective ones of said lens pairs are below said liquid level surface and for returning said refracted pulses at substantially a right angle relative thereto through said receive waveguide means to said transducer means, said returned pulses being indicative of said liquid level; and
signal means connected to said transducer means for determining the number of returned pulses and generating an output signal representing said liquid level in response thereto.

12. A liquid level sensor comprising:
a pair of elongated ultrasonic waveguides adapted to being positioned in a liquid-containing vessel and being separated from one another by a preselected dimension to define a space, each of said waveguides including means defining plural discrete lens portions on the exterior surface thereof, said lens portions being substantially equally spaced apart relative to one another by a predetermined dimension along the axial length of said waveguides, each of said lens portions of one of said waveguides being opposingly disposed with a respective one of said lens portions of the other of said waveguides to establish plural pairs of lens portions;
ultrasonic transducer means connected to said pair of waveguides for transmitting ultrasonic waves of preselected wavelength to one of said waveguides thereof and for receiving pulses indicative of liquid level in said vessel from the other of said waveguides thereof; wherein
said lens pair defining means operates to permit cross coupling between said pair of waveguides of said pulses at substantially right angles relative thereto when said liquid occupies said space therebetween yet prevents cross coupling between said pair of waveguides of said pulses when air occupies said space, wherein the number of pulses returned to said transducer means by virtue of said cross coupling of said lens pairs is indicative of said liquid level in said vessel.

* * * * *